United States Patent [19]
Seibert

[11] Patent Number: 5,849,407
[45] Date of Patent: Dec. 15, 1998

[54] INSULATION LAYER FOR FIRE-PROOFED ROOMS

[75] Inventor: Hermann Seibert, Kaiserslautern, Germany

[73] Assignee: Roehm GmbH Chemische Fabrik, Darmstadt, Germany

[21] Appl. No.: 772,278

[22] Filed: Dec. 20, 1996

[30] Foreign Application Priority Data

Dec. 20, 1995 [DE] Germany ......................... 195 47 672.7

[51] Int. Cl.$^6$ ................................ B32B 5/26; B32B 5/28; B32B 15/08; B32B 27/04
[52] U.S. Cl. ..................................... 428/316.6; 428/300.7; 428/301.1; 428/318.4; 428/319.1; 428/319.3; 442/223; 442/224; 442/292; 442/372; 442/373
[58] Field of Search ............................ 428/300.7, 301.1, 428/316.6, 318.4, 319.1, 319.3; 442/223, 224, 292, 272, 373

[56] References Cited

U.S. PATENT DOCUMENTS

| | | | |
|---|---|---|---|
| 4,316,934 | 2/1982 | Maier et al. | 428/308.4 |
| 4,530,877 | 7/1985 | Hadley | 428/305.5 |
| 5,219,648 | 6/1993 | Morimoto et al. | 428/316.6 |

FOREIGN PATENT DOCUMENTS

| | | |
|---|---|---|
| 1045229 | 10/1966 | United Kingdom . |
| 1078425 | 8/1967 | United Kingdom . |
| 2134845 | 8/1984 | United Kingdom . |
| 310 561 | 4/1989 | United Kingdom . |

*Primary Examiner*—Marion E. McCamish
*Assistant Examiner*—Blaine R. Copenheaver
*Attorney, Agent, or Firm*—Oblon, Spivak, McClelland, Maier & Neustadt, P.C.

[57] ABSTRACT

The present invention relates to combined insulation layers (ISS), preferably for use in shipbuilding, encompassing (i) an outer layer (AS) consisting of sheet metal, combined with (ii) a melamine layer (MSS), (iii) a sheet aluminum layer, (iv) a core layer of a hard foam material (HSS), coated on both sides with a phenolic resin prepreg (PNP).

6 Claims, No Drawings

INSULATION LAYER FOR FIRE-PROOFED ROOMS

BACKGROUND OF THE INVENTION

1. Field of the Invention

The present invention relates to a new type of insulation for fire-proofed areas, especially areas on ships.

2. Discussion of the Background

Making fire-proofed areas available is a topic which has been a concern throughout the development of civilization. The chemical industry has made decisive contributions to fire protection, by means of the development of fire-resistant materials, both inorganic and organic. (Cf. Kirk-Othmer, Encyclopedia of Chemical Technology, 3rd Ed., Vol. 10, 384–444, J. Wiley, 1980; ibid. Vol. 13, 598–605, J. Wiley, 1981).

Even more than in the private sector, fire protection has developed also in the public and military sector, partly because of the aspect of the danger to a larger number of lives.

In addition to traffic and gathering centers which are in a specific location, such as train stations, hotels, concert halls, theaters, lecture halls, churches, hospitals, banks, public and private administrative buildings, etc., large groups of people occur in the sector of train traffic, air traffic and ship traffic. For the two latter means of transportation, the aspect of a limited possibility of escape in the case of fire plays a large role, which is brought to the awareness of the general public again and again by minor or major catastrophes.

Because of the special danger potential in modern mass transport, this is understandably an area of emphasis for public interest, and the result has been, among other things, restrictive legislation and strict national and international approval and licensing practices. The most optimum thermal insulation possible for potentially endangered rooms is among the obvious protection measures.

Thermal insulation is generally defined as the resistance which a material has, or material layers have, to heat transfer (Cf. e.g. ASTM C 168).

On ships, fire regulations are controlled by the International Maritime Organization (IMO).

IMO requires that passenger, freight and fishing ships be equipped with specific fire protection measures. IMO differentiates between different modules of the ship which must be protected against the effect of an overly high temperature, by means of a suitable insulation layer. In Resolution A.754(18), these modules are described, and the requirements which the corresponding insulation layer must satisfy are established. The insulation layers are acted on by temperature on one side, in accordance with a precisely specified sequence. This is done as follows:

temperature at the end of the first 5 min: 576° C.

temperature at the end of the first 10 min: 679° C.

temperature at the end of the first 15 min: 738° C.

temperature at the end of the first 30 min: 871° C.

temperature at the end of the first 60 min: 945° C.

During this test, the temperature measured on the side of the insulation facing away from the heat source should not exceed 140° C.

Depending on the module and the time duration of temperature impact, the following classifications are distinguished:

| | |
|---|---|
| A-60 | 60 min = most severe test |
| A-30 | 30 min |
| A-15 | 15 min |
| A-0 | 0 min |
| B-30 | 30 min |
| B-15 | 15 min |
| B-0 | 0 min |
| F-30 | 30 min |
| F-25 | 15 min |
| F-0 | 0 min |

Existing technology prefers to use multi-layer thermal insulation material, which has reflective metal outer layers and mineral wool inner layers (cf. Kirk-Othmer, Vol. 13, loc. cit., p. 596). Thus, in shipbuilding, insulation layers with the configuration sheet steel/rock wool/sheet steel are currently being used. Depending on the requirements set for the insulation layer, the thicknesses of the individual layers vary, and, therefore, of course, the total thickness and weight per surface area also vary.

Fundamentally, it can be said that such insulation layers have a high weight per surface area. This is particularly true for A-60, A-30, B-30, and F-30 insulation layers. Because of the high weight per surface area of the existing insulation layers, there are significant weight problems and additional problems due to an overly high center of gravity for large passenger ships. Since a trend towards faster and faster ships is being observed in the shipbuilding industry, light-weight solutions are also being looked for in connection with fire insulation, in order to save weight, save drive power, and reduce energy consumption.

From the information above, the wish to have lighter insulation layers, particularly for shipbuilding, becomes clear; of course these must also satisfy the current safety regulations.

What is especially being looked for is an insulation layer which meets the following requirements:

1. Classification A-60, A-30, A-15/B-30, B-15/F-30, F-15

2. Total thickness<80 mm, for A-60

3. Weight per surface area<20 kg/m$^2$, for A-60

The insulation layer must substantially retain its structural properties under the influence of the test temperature at test duration. The selection of the possible materials seems to be limited primarily due to the fact that materials containing hydrocarbons, for example organic, synthetic polymers, must be classified as being fundamentally flammable. (Kirk-Othmer, Vol. 10, loc. cit., p. 348). However, aluminum also has to be classified as flammable under suitable conditions.

SUMMARY OF THE INVENTION

It was now found that completely unexpectedly, the insulation layers according to the present invention meet the requirements of shipbuilding technology, particularly the fire test for insulation according to IMO specification A-60. The combined insulation layers (ISS) according to the invention are composed of:

(i) an outer layer (AS) encompassing a sheet metal, for example sheet aluminum, with a layer thickness of preferably about 0.5 mm, combined with (ii) a melamine foam layer (MSS) with a layer thickness of preferably about 42 mm, (iii) a sheet metal, for example sheet aluminum, with a layer thickness of preferably about 0.5 mm, (iv) a core layer of a hard foam material (HSS), for example poly(meth)acrylimide (PMI) foam (PMI-SS), with a layer thickness of preferably about 30 mm, coated on both sides with a phenolic resin prepreg (PNP), with a layer thickness of preferably about 0.3 mm.

As a guideline value for the total thickness of the combined insulation layers (ISS), a value of 70–75 mm, preferably of 73.6 mm, will be indicated, with a surface weight of $20\pm1$ kg/m$^2$, preferably 19 kg/m$^2$.

DETAILED DESCRIPTION OF THE INVENTION

The individual components of the insulation layer (ISS) are known:

Known commercial products for example (cf. Ullmann's Encyclopedia of Industrial Chemistry, 5th Ed., Vol. A 11, p. 453, VCH 1988), the product RECORE® from the company GLASIS AB, Söråker (Sweden), with a surface weight of 210 kg/m$^3$, can be used as the melamine foam (MSS) according to the present invention. By varying the thickness and density of the melamine foam layer (ii), or by varying the thickness of the layer (iv), weight-optimized composites can be determined for all the classifications mentioned above, where these are clearly lighter than the systems of the state of the art.

Known hard form resins based on poly(meth)acrylimide, e.g. PMI foams, poly(methyl methacrylate) (PMMA), poly (vinyl chloride) (PVC), acrylonitrile/butadiene/styrene copolymers (ABS), polycarbonate (PC) are all possible for use as the hard foam core layer of the layer combination (iv), as are hard foams based on polyolefins, cellulose acetate, epoxy resins, polystyrene, poly(ether imide), polyamide, polyimide, poly(phenylene oxide), polysulfon and polyurethane.

Additional information is contained, for example, in H. F. Mark et al., Encyclopedia of Polymer Science & Engineering, Vol. 3, 1–49, J. Wiley, 1985; Ullmann's Encyclopedia of Industrial Chemistry, 5th Ed., Vol. A 11, 435–464 VCH 1988 or DE-A 42 07 057.

As prepregs of the layer (iv), phenol Novolac prepregs have particularly preferred.

The present invention will be explained in more detail using the example of polymethacrylimide foams (cf. Ullmann's Encyclopedia of Industrial Chemistry Vol. A 11, loc. cit., p. 456).

The poly(meth)acrylimide foams (PMI-SS) have been described, for example, in GB-A 1 078 425 and GB-A 1 045 229, as well as in DE 18 17 156 which are incorporated herein by reference. They contain cyclic structures with an imide group as characteristic units. Their heat shape retention (according to DIN 53 424) is usually in the range of 180°–220° C. Such PMI polymer foams are commercially available under the trade name ROHACELL® from R öhm GmbH. The product preferably used is ROHACELL 51S.

In the present case, the surface weight of the polymethacrylimide foam (PMI-SS) of layer (iv) is usually about $52\pm12$ kg/m$^3$.

Composite materials such as those present in layer (iv), are also known, as already mentioned (cf. B. Carlowitz, ed., Die Kunststoffe (Plastics), Kunststoff-Handbuch (Plastics Handbook), Vol. 1, 321, 484, C. Hanser, 1990).

For the case of a PMI core layer, for example, reference can be made to GB 2 134 845, DE-A 29 27 122, US 4,316,934; EP 0 22 168; EP-A 310 561, which are incorporated herein by reference.

For production of layer (iv), it is practical to place the prepreg material onto the foam plate with the appropriate dimensions, inside a mold, in the amount suitable for the weight, and to apply pressure. The plastic material of the prepreg, which contains fibers, softens at the surface, and the layer is anchored in the pores of the adjacent foam layer.

Typical working conditions under which the prepregs start to flow and to harden are pressures of more than 1N/mm$^2$ and temperatures in the range of 60°–180° C. The pressing period is usually 12 min–120 min, a more preferred range is between 12 and 30 minutes.

The prepregs used as components of layer (iv) are, as usual, resins in layer form, with fibers embedded in them, if necessary in the form of strands, woven materials or non-woven materials, which are solid at room temperature, and capable of flow when heated. The resins consist of a phenolic resin, for example a phenol-Novolac duroplastic. (Cf. H. F. Mark et al., Encyclopedia of Polymer Science & Engineering, Vol. 11, 62–84, J. Wiley, 1988).

The individual layers of the combined insulation layers (ISS) can be joined together in known manner, or can be used within a common frame.

The combined insulation layers (ISS) according to the invention meet the requirements of the state of the art, as was already mentioned, particularly the standards established by the IMO, where an adaptation to all the classifications mentioned can be achieved by varying the layer thickness of layers (ii) and (iv).

The combined insulation layers according to the invention make it possible to make available fire-proofed areas which particularly meet the restrictive requirements of shipbuilding. They result in a significant weight savings potential and thereby also contribute to better utilization of fuels and greater profitability in ship transport.

The disclosure of priority German Application No. 195 47 672.7, filed Dec. 20, 1995, is hereby incorporated by reference.

Obviously, numerous modifications and variations of the present invention are possible in light of the above teachings. It is, therefore, to be understood that within the scope of the appended claims, the invention may be practiced otherwise than as specifically described herein.

What is claimed as new and desired to be secured by Letters Patent of the United States is:

1. An insulated structure, comprising:
   combined insulation layers, comprising in order:
   (i) an outer layer of sheet metal,
   (ii) a melamine foam layer,
   (iii) a sheet metal layer,
   (iv) a core layer of a hard foam material, coated on opposite sides with a phenolic resin prepreg.

2. The insulated structure of claim 1, wherein said layer (i) and said layer (iii) are sheets of aluminum.

3. The insulated structure of claim 1, wherein the total thickness of the combined insulation layers is 70–75 mm, and the weight per surface area is $20\pm1$ kg/m$^2$.

4. The insulated structure of claim 1, wherein
   said layer (i) has a layer thickness of about 0.5 mm,
   said layer (ii) has a layer thickness of about 42 mm,
   said layer (iii) has a layer thickness of about 0.5 mm,
   said layer (iv) has a layer thickness of about 30 mm, and
   wherein each of said prepreg layers are about 0.3 mm thick.

5. The insulated structure of claim 1, wherein said combined insulation layers meet A-60 fire safety requirements when the total thickness of said combined insulation layers is less than 80 mm and the weight per surface area is less than 20 kg/m$^2$.

6. A method for the production of a fire-proofed area, comprising:

(i) forming an outer layer of sheet metal, (ii) providing on said outer layer of sheet metal in order:
 (a) a melamine foam layer;
 (b) an additional sheet metal layer; and
 (c) a core layer of a hard form material, coated on opposite sides with a phenolic resin prepreg.

* * * * *